(12) United States Patent
Sekiguchi et al.

(10) Patent No.: US 10,953,911 B2
(45) Date of Patent: Mar. 23, 2021

(54) STEERING DEVICE

(71) Applicant: YAMADA MANUFACTURING CO., LTD., Kiryu (JP)

(72) Inventors: Toru Sekiguchi, Kiryu (JP); Taisuke Honma, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 73 days.

(21) Appl. No.: 16/520,807

(22) Filed: Jul. 24, 2019

(65) Prior Publication Data

US 2020/0039568 A1 Feb. 6, 2020

(30) Foreign Application Priority Data

Jul. 31, 2018 (JP) .............................. JP2018-143338

(51) Int. Cl.
*B62D 1/19* (2006.01)
*B62D 1/181* (2006.01)
*B62D 1/185* (2006.01)

(52) U.S. Cl.
CPC ............. *B62D 1/192* (2013.01); *B62D 1/181* (2013.01); *B62D 1/185* (2013.01)

(58) Field of Classification Search
None
See application file for complete search history.

(56) References Cited

U.S. PATENT DOCUMENTS

| | | | | |
|---|---|---|---|---|
| 10,604,172 B2* | 3/2020 | Yoon | ................ | B62D 1/187 |
| 10,800,442 B2* | 10/2020 | Ishimura | ................ | B62D 1/192 |
| 2007/0194563 A1* | 8/2007 | Menjak | ................ | B62D 1/195 |
| | | | | 280/777 |
| 2015/0232117 A1* | 8/2015 | Stinebring | ............ | B62D 1/195 |
| | | | | 74/493 |
| 2019/0100230 A1* | 4/2019 | Messing | ................ | B62D 1/195 |
| 2019/0126968 A1* | 5/2019 | Messing | ................ | B62D 1/181 |
| 2019/0152511 A1* | 5/2019 | Shiroishi | ................ | B62D 1/192 |
| 2019/0322307 A1* | 10/2019 | Kwon | ................ | B62D 1/195 |
| 2020/0207402 A1* | 7/2020 | Fricke | ................ | B62D 1/195 |

FOREIGN PATENT DOCUMENTS

EP 3124355 A2 * 2/2017 ............. B62D 1/192
JP 2016-049923 4/2016

* cited by examiner

*Primary Examiner* — Drew J Brown
(74) *Attorney, Agent, or Firm* — Rankin, Hill & Clark LLP (57) ABSTRACT

According to an aspect, there is provided a steering device including a pipe, a housing, a telescopic mechanism, and a load absorbing mechanism. The load absorbing mechanism includes an EA plate disposed in the pipe, a guide plate disposed in a telescopic movable portion, and overlapped with the EA plate, and a connection member connecting the EA plate and the guide plate to each other. Dimensions of the load absorbing mechanism are set so that a load applied between the connection member and the EA plate is lower than a load applied between the connection member and the guide plate.

5 Claims, 7 Drawing Sheets

STEERING DEVICE

CROSS-REFERENCE TO RELATED APPLICATION

Priority is claimed on Japanese Patent Application No. 2018-143338, filed on Jul. 31, 2018, the content of which is incorporated herein by reference.

BACKGROUND OF THE INVENTION

Field of the Invention

The present invention relates to a steering device.

Description of Related Art

A certain steering device is provided with a telescopic function. The telescopic function is to adjust front and rear positions of a steering wheel in accordance with a body difference or driving posture of a driver. As this type steering device, a configuration is known which includes a main tube, an outer tube, and an inner tube (for example, refer to Japanese Unexamined Patent Application, First Publication No. 2016-49923 (hereafter, referred to as Patent Document 1)). The main tube is supported by a vehicle body. The outer tube is held inside the main tube so as to be movable in a forward-rearward direction. The inner tube is held inside the outer tube, and rotatably supports the steering shaft.

According to the invention disclosed in Patent Document 1 described above, the inner tube has a slit extending in the forward-rearward direction. The outer tube is joined to the inner tube by a bolt inserted into the slit of the inner tube.

In the steering device according to the invention disclosed in Patent Document 1, during a telescopic operation, the outer tube, the inner tube, and a steering shaft integrally move forward to and rearward from the main tube.

In a case where a predetermined load is applied to a steering wheel at the time of secondary collision, the inner tube attempts to move forward to the outer tube. In this case, the inner tube moves forward while the bolt widens the slit, thereby relieving an impact load applied to the driver at the time of secondary collision.

According to the above-described related art, in order to secure a stroke of the inner tube at the time of secondary collision, it is necessary to increase a length of the slit. However, if the length of the slit is increased so as to secure a movement space of the bolt, there is a possibility that layout quality around the inner tube may be degraded. In addition, there is a possibility that the steering device may increase in size.

Therefore, according to an aspect of the present invention, there is provided a steering device which can secure a stroke of a pipe at the time of a secondary collision while preventing degraded layout quality or an increased size of the steering device.

SUMMARY OF THE INVENTION

In order to solve the above-described problems, the present invention adopts the following aspects.

(1) According to an aspect of the present invention, there is provided a steering device including a pipe into which a steering shaft is inserted so as to be rotatable around a first axis line extending along a forward-rearward direction, a housing that supports the pipe so as to be movable in the forward-rearward direction, a telescopic mechanism that is disposed between the housing and the pipe, and that switches between allowance and regulation of movement of the pipe with respect to the housing, and a load absorbing mechanism that is disposed between the pipe and the telescopic mechanism. The load absorbing mechanism includes an EA plate disposed in the pipe, a guide plate disposed in the telescopic mechanism, and overlapped with the EA plate when viewed in an intersection direction intersecting the forward-rearward direction, and a connection member which connects the EA plate and the guide plate to each other, and which is relatively slidable on the EA plate and the guide plate in a case where a forward acting load applied to the pipe has a predetermined value or greater. In a case where the forward acting load applied to the pipe has the predetermined value or greater, the load absorbing mechanism sets sliding resistance between the connection member and a first plate out of the EA plate and the guide plate and sliding resistance between the connection member and a second plate out of the EA plate and the guide plate so that the connection member relatively moves forward to the second plate after the first plate relatively moves forward to the connection member.

In the steering device according to this aspect, at the time of second collision, a collision load can be relieved by the sliding resistance (load) applied during relative movement between the connection member and the first plate and the sliding resistance (load) applied during relative movement between the connection member and the second plate. That is, the connection member slides on both the EA plate and the guide plate. Therefore, for example, compared to a configuration in which an impact load is relieved only by the sliding movement between the EA plate and the connection member, the length of the EA plate in the forward-rearward direction can be shortened as much as a relative movement distance between the EA plate and the connection member. In this manner, front and rear spaces are likely to be secured for the EA plate, and layout quality around the pipe can be improved.

In particular, according to the present embodiment, the sliding resistance between the plate and the connection member and the sliding resistance between the guide plate and the connection member are set so that the relative movement (first stroke) between the EA plate and the connection member and the relative movement (second stroke) between the guide plate and the connection member are performed separate from each other. In this manner, load fluctuations are likely to be managed between the first stroke and the second stroke, and thus, the impact load can be effectively relieved.

(2) In the steering device according to the above-described aspect (1), the EA plate may have an EA long hole penetrating the EA plate in the intersection direction, and extending in the forward-rearward direction. The guide plate may have a guide long hole penetrating the guide plate in the intersection direction, and extending in the forward-rearward direction. The connection member may connect the EA plate and the guide plate to each other by penetrating a front end portion of the EA long hole and a rear end portion of the guide long hole.

According to this aspect, the EA plate and the guide plate can be reliably connected to each other by the connection member. In this manner, when in normal use (for example, during a telescopic operation), the pipe and the telescopic mechanism can be reliably connected to each other via the load absorbing mechanism, and thus, the telescopic operation is stabilized. At the time of secondary collision, the EA plate, the guide plate, and the connection member can be stably slid.

(3) In the steering device according to the above-described aspect (2), the EA long hole may have a first large diameter portion which is located in the front end portion of the EA long hole, and into which the connection member is inserted, and a first small diameter portion which is linked to the first large diameter portion, and which is widened by the connection member during relative movement between the connection member and the EA plate in the forward-rearward direction. The guide long hole may have a second large diameter portion which is located in the rear end portion of the guide long hole, and into which the connection member is inserted, and a second small diameter portion which is linked to the second large diameter portion, and which is widened by the connection member during relative movement between the connection member and the guide plate in the forward-rearward direction. The width of the first small diameter portion may be wider than the width of the second small diameter portion.

According to the present embodiment, it is easy to set the sliding resistance between the EA plate and the connection member so as to be lower than the sliding resistance between the guide plate and the connection member. In this manner, the first stroke is more likely to be performed earlier than the second stroke.

Moreover, the connection member relatively slides on both the EA plate and the guide plate. Accordingly, compared to a case where the impact load is relieved by a first stage stroke as in the related art, it is possible to prevent the movement of the connection member from being hindered by burrs generated when the slit is widened. Therefore, it is possible to prevent an excessive increase in the sliding resistance between the EA plate and the connection member and the sliding resistance between the guide plate and the connection member.

(4) In the steering device according to the above-described aspect (2) or (3), the EA plate may have a thinner plate thickness than the guide plate.

According to the present embodiment, it is easy to set the sliding resistance between the EA plate and the connection member so as to be lower than the sliding resistance between the guide plate and the connection member. In this manner, the first stroke is more likely to be performed earlier than the second stroke.

(5) In the steering device according to any one of the above-described aspect (1) to (4), the telescopic mechanism may include a motor unit disposed in the housing, a shaft having a male screw joined to an output shaft of the motor unit, and a nut screwed to the shaft.

According to this configuration, at the time of secondary collision, the male screw of the shaft and the nut come into contact with each other. Accordingly, the forward movement of the nut with respect to the housing is regulated. In this manner, it is possible to regulate the guide plate in moving forward to the nut, and the relative movement between the EA plate and the connection member can be promoted. In this case, it is not necessary to separately provide a fixing portion of the guide plate. Therefore, it is possible to prevent an increase in the number of components and a complicated configuration.

According to the above-described respective aspects, the stroke of the pipe can be secured at the time of secondary collision while preventing the degraded layout quality.

DETAILED DESCRIPTION OF THE INVENTION

Hereinafter, an embodiment according to the present invention will be described with reference to the drawings.

Steering Device

Figure 1:
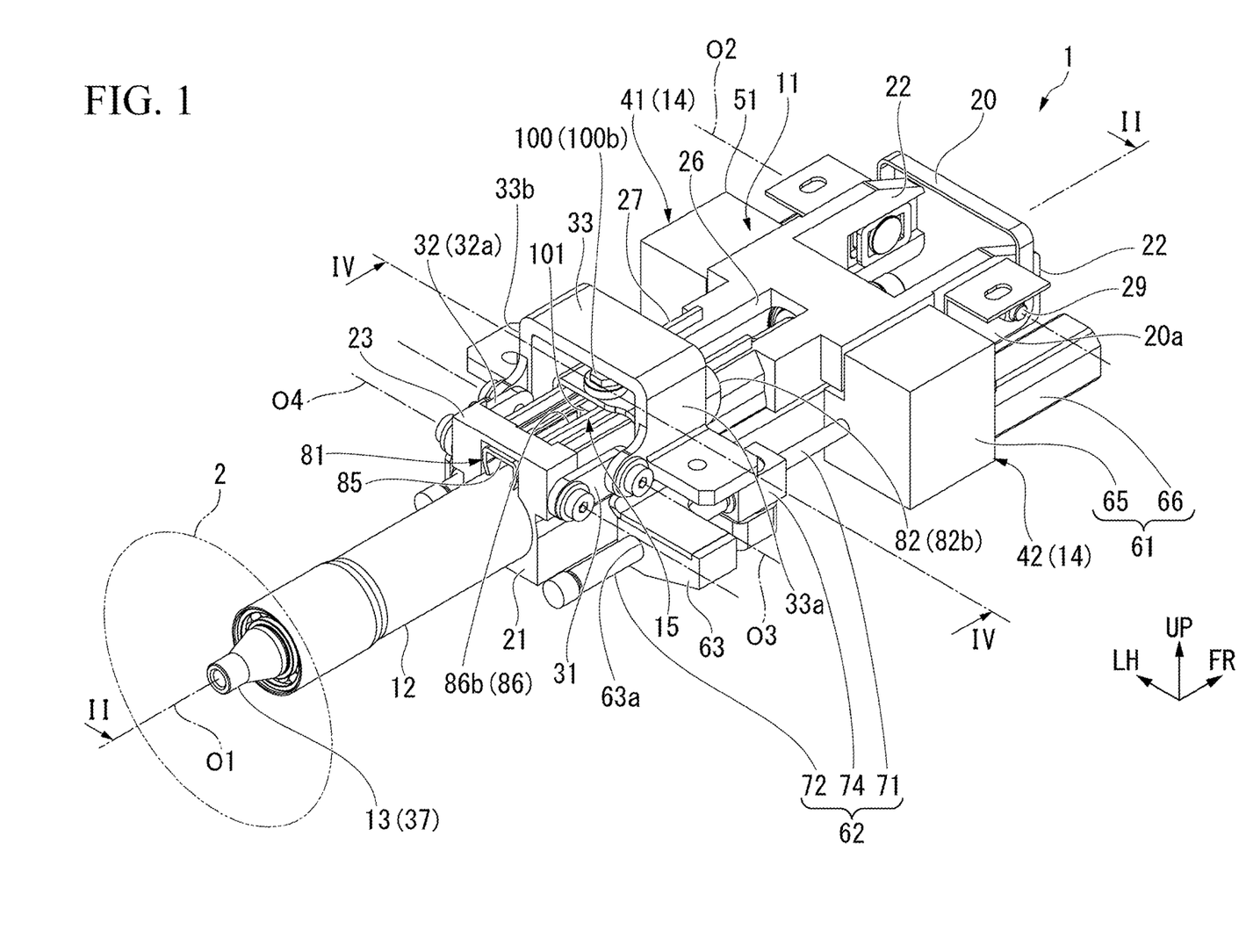
FIG. 1 is a perspective view of a steering device.

FIG. 1 is a perspective view of a steering device 1.

As shown in FIG. 1, the steering device 1 is mounted on a vehicle. The steering device 1 adjusts a steering angle of wheels in accordance with a rotating operation of a steering wheel 2.

The steering device 1 includes a housing 11, a pipe 12, a steering shaft 13, a drive mechanism 14, and a load absorbing mechanism 15. The pipe 12 and the steering shaft 13 are respectively formed along an axis line (first axis line) O1. Therefore, in the following description, an extending direction of the axis line O1 of the pipe 12 and the steering shaft 13 will be simply referred to as a shaft axis direction, a direction perpendicular to the axis line O1 will be simply referred to as a shaft radial direction, and a direction around the axis line O1 will be simply referred to as a shaft circumferential direction, in some cases.

The steering device 1 according to the present embodiment is mounted on the vehicle in a state where the axis line O1 intersects a forward-rearward direction. Specifically, the axis line O1 of the steering device 1 extends upward as the steering device 1 is directed rearward. However, in the following description, for the sake of convenience, in the steering device 1, a direction toward the steering wheel 2 in the shaft axis direction will be simply referred to as rearward, and a direction toward a side opposite to the steering wheel 2 will be simply referred to as forward (arrow FR). In the shaft radial direction, an upward-downward direction in a state where the steering device 1 is attached to the vehicle will be simply referred to as an upward-downward direction (arrow UP represents upward), and a rightward-leftward direction in the same state will be simply referred to as a rightward-leftward direction (arrow LH represents a left side).

Housing

The housing 11 is attached to a vehicle body via brackets (front side bracket 20 and rear side bracket 33). The housing 11 has a holding cylinder 21, a front side mounting stay 22, and a rear side mounting stay 23.

Figure 2:
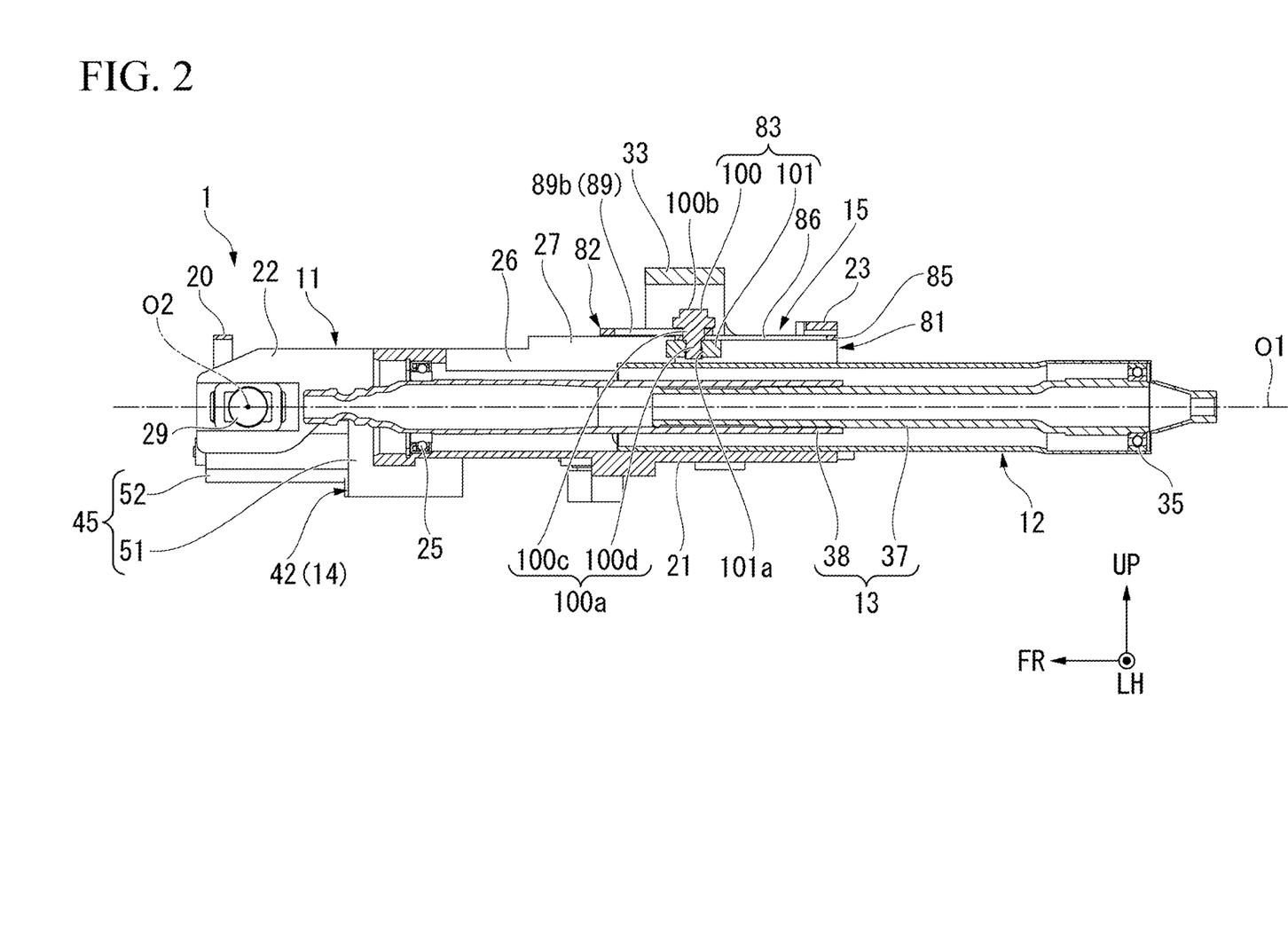
FIG. 2 is a sectional view taken along line II-II in FIG. 1.

FIG. 2 is a sectional view taken along line II-II in FIG. 1.

As shown in FIGS. 1 and 2, the holding cylinder 21 is formed in a cylindrical shape extending in the shaft axis direction (forward-rearward direction). As shown in FIG. 2, an outer ring of a front side bearing 25 is fitted (press-fitted) to a front end portion inside the holding cylinder 21. In a rear portion of the holding cylinder 21, a slit 26 is formed in a portion (in the present embodiment, an upper portion of the holding cylinder 21) in the shaft circumferential direction. The slit 26 penetrates the holding cylinder 21 in the shaft radial direction.

As shown in FIG. 1, in the holding cylinder 21, guide rails 27 are formed in portions located on both sides of the slit 26 in the rightward-leftward direction. The guide rail 27 extends in the shaft axis direction. In the present embodiment, an upper surface of the guide rail 27 is a flat surface. The guide rail 27 has a function to prevent a guide plate 82 (to be described later) from being fallen down at the time of secondary collision.

The front side mounting stays 22 respectively extend forward from the portions located on both sides in the rightward-leftward direction in the front end portion of the holding cylinder 21. The above-described front side bracket 20 is attached to the front end portion of the front side mounting stay 22.

The front side bracket 20 connects the front side mounting stay 22 and the vehicle body to each other. Specifically, the front side bracket 20 is formed in a U-shape which is open downward in a front view when viewed in the shaft axis direction. The front side bracket 20 surrounds the front end portion of the housing 11 from above and from both sides in the rightward-leftward direction. In the front side bracket 20, front side walls 20a and 20a located on both sides in the rightward-leftward direction are connected to the front side mounting stay 22 by pivot shafts 29 and 29 extending in the rightward-leftward direction. In this manner, the housing 11 is supported by the front side bracket 20 so as to be pivotable around a pivot shaft 29 (around the axis line O2 extending in the rightward-leftward direction).

The rear side mounting stay 23 is formed in a rear end portion of the holding cylinder 21. Specifically, the rear side mounting stay 23 is located across the slit 26 in the rightward-leftward direction in the upper portion of the holding cylinder 21. The above-described rear side bracket 33 is attached to the rear side mounting stay 23 via link plates (first link plate 31 and second link plate 32).

The rear side bracket 33 is formed in a hat shape which is open downward in a front view. The rear side bracket 33 surrounds the holding cylinder 21 from above and from both sides in the rightward-leftward direction. That is, the rear side bracket 33 has a right side wall 33a located on a first side (right side) in the rightward-leftward direction with respect to the holding cylinder 21 and a left side wall 33b located on a second side (left side) in the rightward-leftward direction with respect to the holding cylinder 21.

The above-described first link plate 31 connects the rear side mounting stay 23 and the rear side bracket 33 to each other on the right side with respect to the housing 11. The first link plate 31 is formed in a plate shape extending along the shaft axis direction in a side view when viewed in the rightward-leftward direction. The front end portion of the first link plate 31 is supported by the above-described right side wall 33a so as to be pivotable around an axis line O3 extending in the rightward-leftward direction. The rear end portion of the first link plate 31 is supported by the rear side mounting stay 23 so as to be pivotable around an axis line O4 extending in the rightward-leftward direction.

Figure 3:
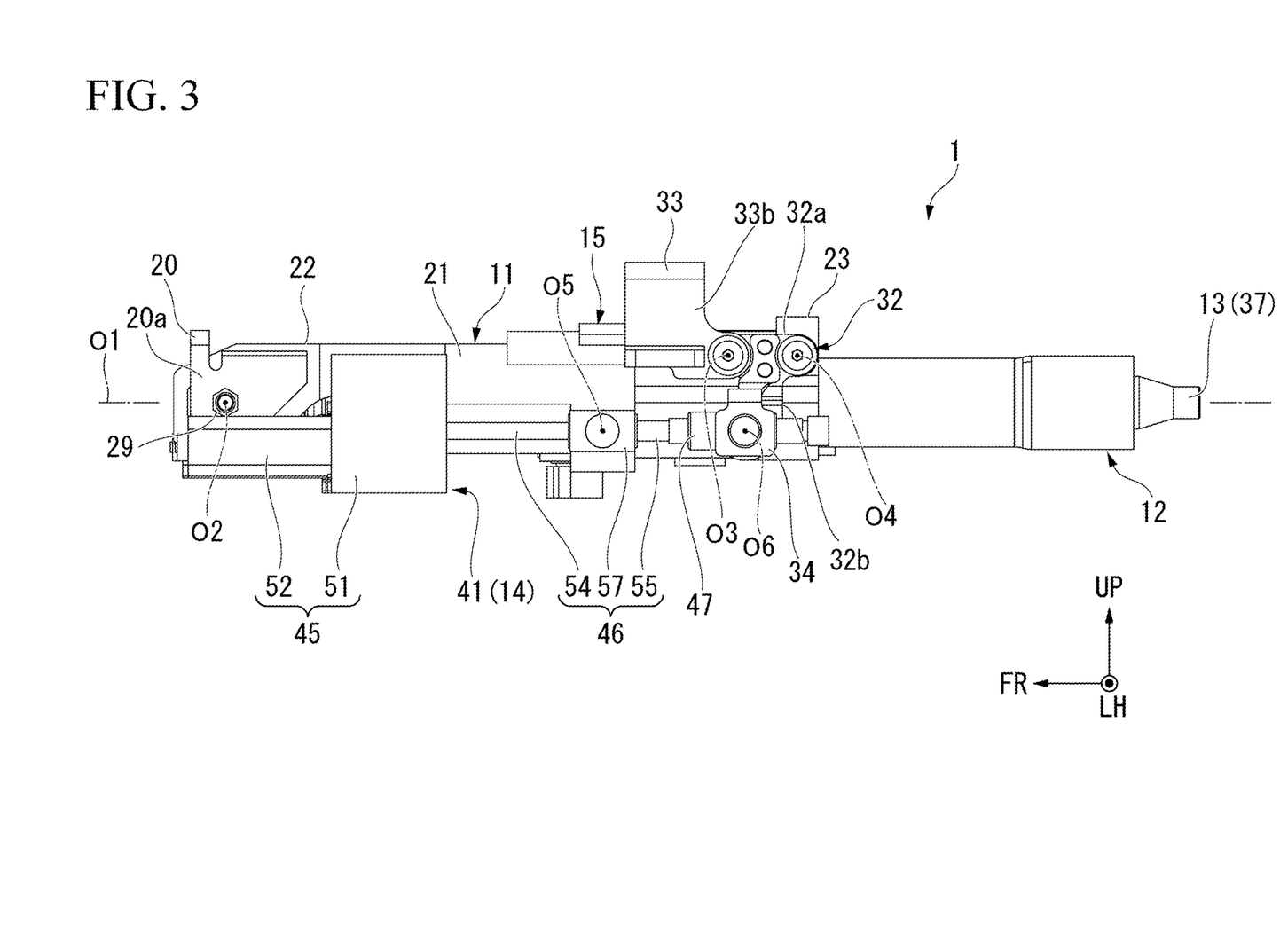
FIG. 3 is a left side view of the steering device.

FIG. 3 is a left side view of the steering device 1.

As shown in FIG. 3, the above-described second link plate 32 connects the rear side mounting stay 23 and the rear side bracket 33 to each other on the left side with respect to the housing 11. The second link plate 32 is formed in a T-shape in a side view. Specifically, the second link plate 32 has a forward-rearward extending portion 32a and a downward extending portion 32b extending downward from the forward-rearward extending portion 32a. The front end portion of the forward-rearward extending portion 32a is supported by the above-described left side wall 33b so as to be pivotable around the axis line O3. The rear end portion of the forward-rearward extending portion 32a is supported by the rear side mounting stay 23 so as to be pivotable around the above-described axis line O4.

The support plate 34 is attached to the second link plate 32. The support plate 34 is formed in a crank shape extending in the upward-downward direction. The upper end portion of the support plate 34 is fixed to the forward-rearward extending portion 32a. The lower end portion of the support plate 34 faces the downward extending portion 32b at an interval in the rightward-leftward direction.

Pipe

As shown in FIG. 1, the pipe 12 is formed in a cylindrical shape extending in the shaft axis direction. An outer diameter of the pipe 12 is smaller than an inner diameter of the holding cylinder 21. The pipe 12 is inserted into the holding cylinder 21. The pipe 12 is configured to be movable in the shaft axis direction with respect to the holding cylinder 21 (housing 11). An outer ring of the rear side bearing 35 is fitted (press-fitted) to the rear end portion of the pipe 12.

Steering Shaft

As shown in FIG. 2, the steering shaft 13 includes an inner shaft 37 and an outer shaft 38.

The inner shaft 37 is formed in a cylindrical shape extending in the shaft axis direction. The inner shaft 37 is inserted into the pipe 12. The rear end portion of the inner shaft 37 is press-fitted to the inner ring of the above-described rear side bearing 35. In this manner, the inner shaft 37 is supported inside the pipe 12 via the rear side bearing 35 so as to be rotatable around the axis line O1. The steering wheel 2 is joined to a portion protruding rearward from the pipe 12 in the inner shaft 37.

The outer shaft 38 is formed in a cylindrical shape extending in the shaft axis direction. The outer shaft 38 is inserted into the pipe 12 inside the holding cylinder 21. In the rear end portion of the outer shaft 38, the inner shaft 37 is inserted into the pipe 12. The front end portion of the outer shaft 38 is press-fitted to the inner ring of the front side bearing 25 inside the holding cylinder 21. In this manner, the outer shaft 38 is supported so as to be rotatable around the axis line O1 inside the holding cylinder 21.

The inner shaft 37 and the pipe 12 are configured to be movable in the shaft axis direction with respect to the outer shaft 38. The outer peripheral surface of the inner shaft 37 has a male spline, for example. The male spline engages with a female spline formed on the inner peripheral surface of the outer shaft 38. In this manner, the inner shaft 37 moves in the shaft axis direction with respect to the outer shaft 38 while relative rotation with respect to the outer shaft 38 is regulated. However, a telescopic structure or a rotation regulation structure of the steering shaft 13 can be appropriately changed. In the present embodiment, a configuration has been described in which the outer shaft 38 is located forward of the inner shaft 37. However, without being limited to this configuration, the present invention may adopt a configuration in which the outer shaft 38 is located rearward of the inner shaft 37.

Drive Mechanism

As shown in FIG. 1, the drive mechanism 14 includes a tilt mechanism 41 and a telescopic mechanism (actuator) 42. For example, the tilt mechanism 41 is located on the left side of the housing 11. For example, the telescopic mechanism 42 is located on the right side of the housing 11. The drive mechanism 14 may have at least the telescopic mechanism 42.

As shown in FIG. 3, the tilt mechanism 41 includes a tilt motor unit 45, a tilt joint portion 46, and a tilt movable portion 47. The tilt mechanism 41 switches between regulation and allowance of the steering device 1 pivoting around the axis line O2 by driving the tilt motor unit 45.

The tilt motor unit 45 includes a tilt gear box 51 and a tilt motor 52.

Figure 4:
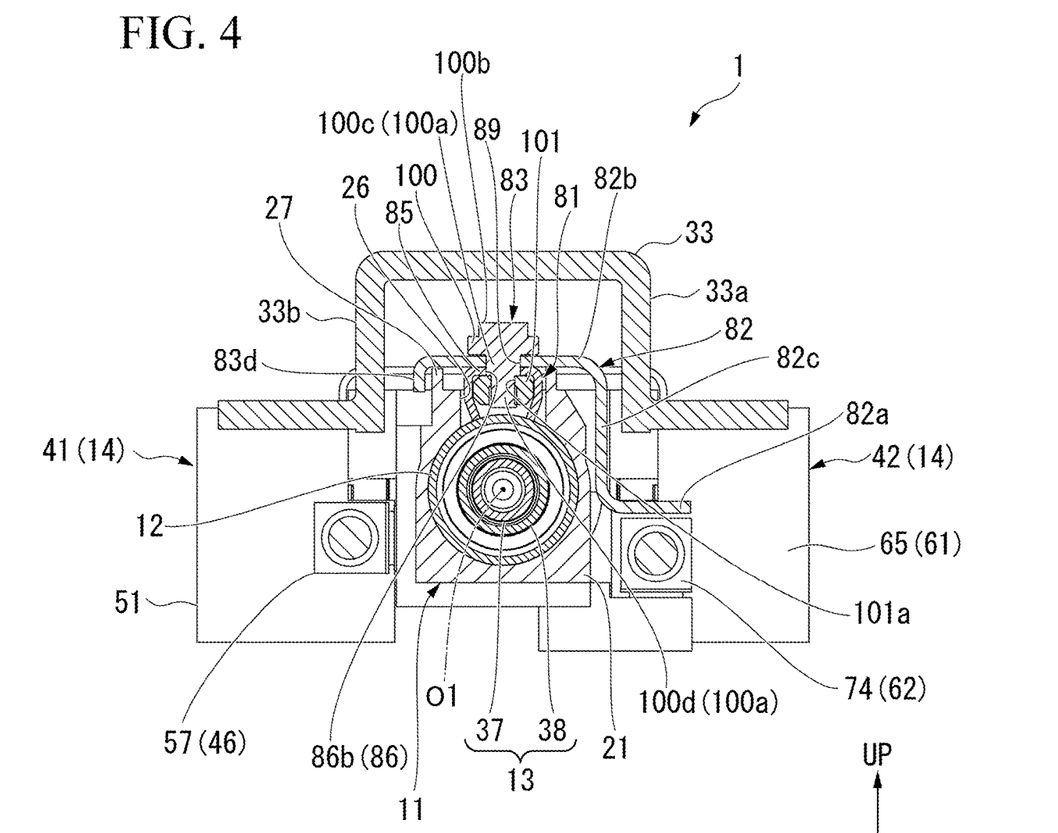
FIG. 4 is a sectional view taken along line IV-IV in FIG. 1.

The tilt gear box 51 protrudes leftward in the front end portion (boundary portion between the holding cylinder 21 and the front side mounting stay 22) of the housing 11 (refer to FIG. 4). The tilt gear box 51 houses a speed reduction mechanism (not shown).

The tilt motor 52 is attached to the front end portion of the tilt gear box 51. In the present embodiment, the tilt motor 52 is attached to the tilt gear box 51 in a state where the axial direction of the output shaft (not shown) is directed in the shaft axis direction. The output shaft of the tilt motor 52 is connected to the speed reduction mechanism inside the tilt gear box 51.

The tilt joint portion 46 includes a tilt wire 54, a tilt shaft 55, and a tilt coupling 57.

The tilt coupling 57 joins the tilt wire 54 and the tilt shaft 55 to each other. The tilt coupling 57 is supported so as to be rotatable around an axis line O5 extending in the rightward-leftward direction in the central portion in the shaft axis direction of the holding cylinder 21.

The tilt wire 54 is laid across the tilt gear box 51 and the tilt coupling 57. The tilt wire 54 is configured to be rotatable in accordance with the driving of the tilt motor 52. The tilt wire 54 is configured to be flexibly deformable. The connection member connecting the tilt gear box 51 and the tilt coupling 57 to each other is not limited to those which are flexibly deformable unlike the tilt wire 54. That is, depending on the layout of the tilt gear box 51 and the tilt coupling 57, the tilt gear box 51 and the tilt coupling 57 may be connected to each other by the connection member which does not flexibly deform.

The tilt shaft 55 is laid across the tilt coupling 57 and the tilt movable portion 47. The tilt shaft 55 is rotated together with the tilt wire 54 in accordance with the driving of the tilt motor 52. A male screw is formed on the outer peripheral surface of the tilt shaft 55.

The tilt movable portion 47 is supported so as to be pivotable around an axis line O6 extending in the rightward-leftward direction between the downward extending portion 32b of the above-described second link plate 32 and the lower end portion of the support plate 34. The tilt movable portion 47 is formed in a cylindrical shape in which the extending direction of the tilt shaft 55 is set as the axial direction. For example, a female screw is formed on the inner peripheral surface of the tilt movable portion 47. The tilt shaft 55 is screwed into the tilt movable portion 47. That is, the tilt movable portion 47 is configured to be movable in the extending direction of the tilt shaft 55 in accordance with the rotation of the tilt shaft 55.

As shown in FIG. 1, the telescopic mechanism 42 includes a telescopic motor unit (motor unit) 61, a telescopic joint portion (joint portion) 62, and a telescopic movable portion (nut) 63. The telescopic mechanism 42 switches between regulation and allowance of the forward and rearward movement of the pipe 12 (steering shaft 13) with respect to the housing 11 by driving the telescopic motor unit 61.

The telescopic motor unit 61 includes a telescopic gear box 65 and a telescopic motor 66.

The telescopic gear box 65 is disposed to protrude rightward in the front end portion of the housing 11. The telescopic gear box 65 houses a speed reduction mechanism (not shown).

The telescopic motor 66 is attached to the front end portion of the telescopic gear box 65. The telescopic motor 66 is attached to the telescopic gear box 65 in a state where the axial direction of the output shaft (not shown) is directed in the shaft axis direction. The output shaft of the telescopic motor 66 is connected to the speed reduction mechanism inside the telescopic gear box 65.

The telescopic joint portion 62 includes a telescopic wire 71, a telescopic shaft (shaft) 72, and a telescopic coupling 74.

The telescopic coupling 74 joins the telescopic wire 71 and the telescopic shaft 72 to each other. The telescopic coupling 74 is supported by a substantially central portion in the shaft axis direction of the holding cylinder 21.

The telescopic wire 71 is laid across the telescopic gear box 65 and the telescopic coupling 74. The telescopic wire 71 is configured to be rotatable in accordance with the driving of the telescopic motor 66. The telescopic wire is configured to be flexibly deformable. The connection member connecting the telescopic gear box 65 and the telescopic coupling 74 to each other may not be flexibly deformable unlike the telescopic wire 71. That is, depending on the layout of the telescopic gear box 65 and the telescopic coupling 74, the telescopic gear box 65 and the telescopic coupling 74 may be connected to each other by the connection member which does not flexibly deform.

The telescopic shaft 72 is laid across the telescopic coupling 74 and the telescopic movable portion 63. The telescopic shaft 72 is rotated together with the telescopic wire 71 in accordance with the driving of the telescopic motor 66. A male screw is formed on the outer peripheral surface of the telescopic shaft 72.

The telescopic movable portion 63 is formed in a block shape. The telescopic movable portion 63 has a through-hole 63a penetrating the telescopic movable portion 63 in the shaft axis direction. For example, a female screw is formed on the inner surface of the through-hole 63a. The telescopic shaft 72 is screwed into the through-hole 63a of the telescopic movable portion 63. That is, the telescopic movable portion 63 is configured to be movable in the extending direction of the telescopic shaft 72 in accordance with the rotation of the telescopic shaft 72.

Load Absorbing Mechanism

Figure 5:
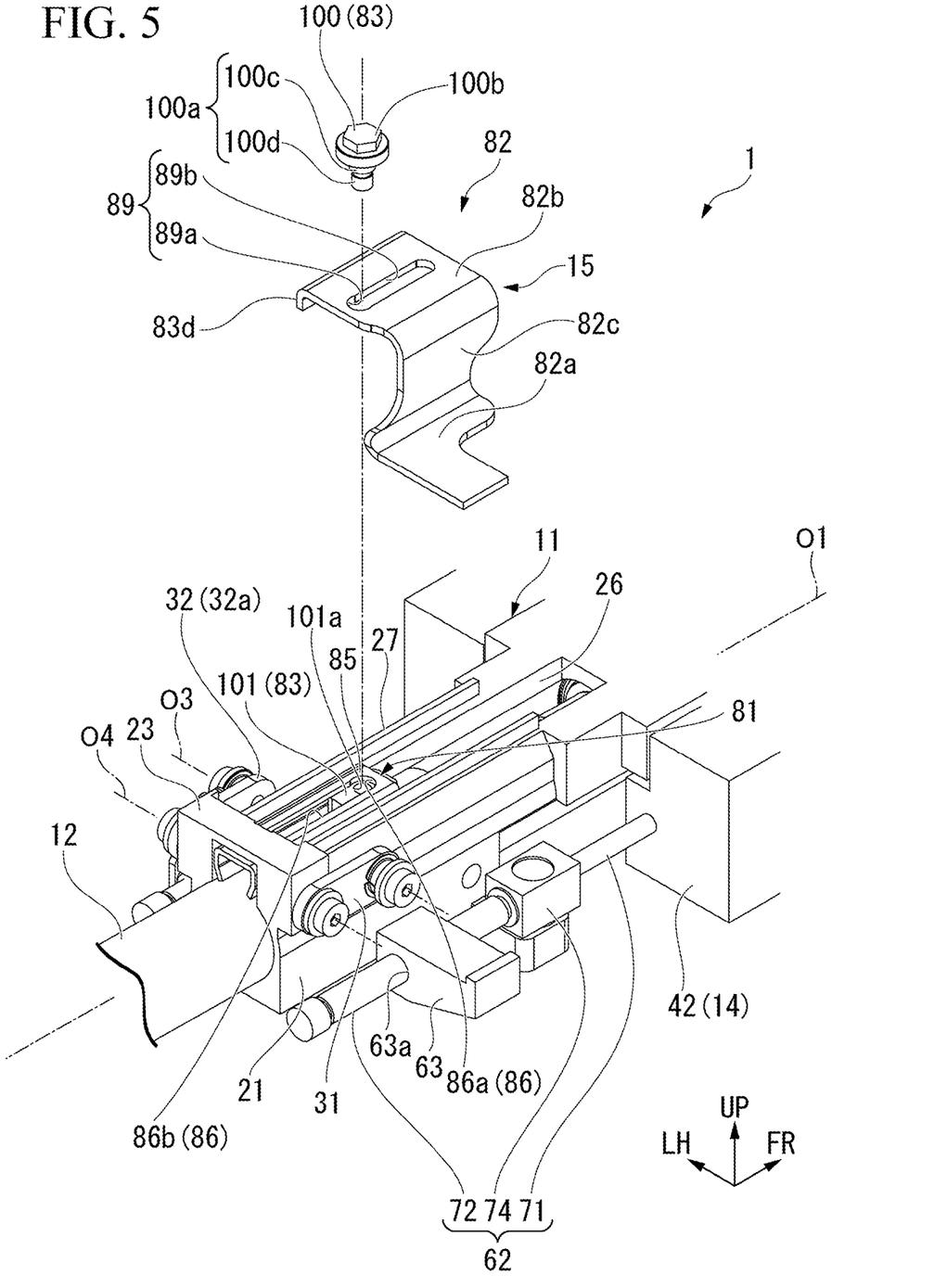
FIG. 5 is an exploded perspective view of a load absorbing mechanism.

FIG. 4 is a sectional view taken along line IV-IV in FIG. 1. FIG. 5 is an exploded perspective view of the load absorbing mechanism 15.

As shown in FIGS. 4 and 5, the load absorbing mechanism 15 includes an energy absorbing (EA) plate 81, the guide plate 82, and a connection member 83 connecting the EA plate 81 and the guide plate 82 to each other. In the present embodiment, the EA plate 81 configures a first plate according to the present invention, and the guide plate 82 configures a second plate according to the present invention. However, the EA plate 81 may configure the second plate according to the present invention, and the guide plate 82 may configure the first plate according to the present invention.

The EA plate 81 extends in the shaft axis direction. The EA plate 81 is formed in a C-shape which is open downward in a front view. The lower end portion of the EA plate 81 is fixed to the upper portion of the pipe 12. The EA plate 81 is housed inside the slit 26 of the housing 11.

As shown in FIG. 5, a top wall portion 85 of the EA plate 81 is located upward of the pipe 12 at an interval. The top wall portion 85 has an EA long hole 86 penetrating the top wall portion 85 in the upward-downward direction. The EA long hole 86 is a long hole extending in the shaft axis direction. Specifically, the EA long hole 86 has a large diameter portion (first large diameter portion) 86a located in the front end portion and a small diameter portion (first small diameter portion) 86b extending rearward from the large diameter portion 86a.

The guide plate 82 connects the above-described telescopic movable portion 63 and the EA plate 81 to each other. The guide plate 82 is formed in a crank shape in a front view. Specifically, the guide plate 82 has a lower wall portion 82a, an upper wall portion 82b, and a connection wall portion 82c connecting the lower wall portion 82a and the upper wall portion 82b to each other.

The lower wall portion 82a is fixed to the upper surface of the telescopic movable portion 63. The connection wall portion 82c extends upward from the left side end portion of the lower wall portion 82a. The upper wall portion 82b extends leftward from the upper end portion of the connection wall portion 82c. The upper wall portion 82b overlaps the EA plate 81 from above the housing 11.

The upper wall portion 82b has a guide long hole 89 penetrating the upper wall portion 82b in the upward-downward direction. The guide long hole 89 is a long hole extending in the shaft axis direction. Specifically, the guide long hole 89 has a large diameter portion (second large diameter portion) 89a located in the rear end portion and a small diameter portion (second small diameter portion) 89b extending forward from the large diameter portion 89a. In the present embodiment, the length of the guide long hole 89 in the shaft axis direction is shorter than the length of the EA long hole 86 in the shaft axis direction. However, the length of the respective long holes 86 and 89 can be appropriately changed.

Figure 6:
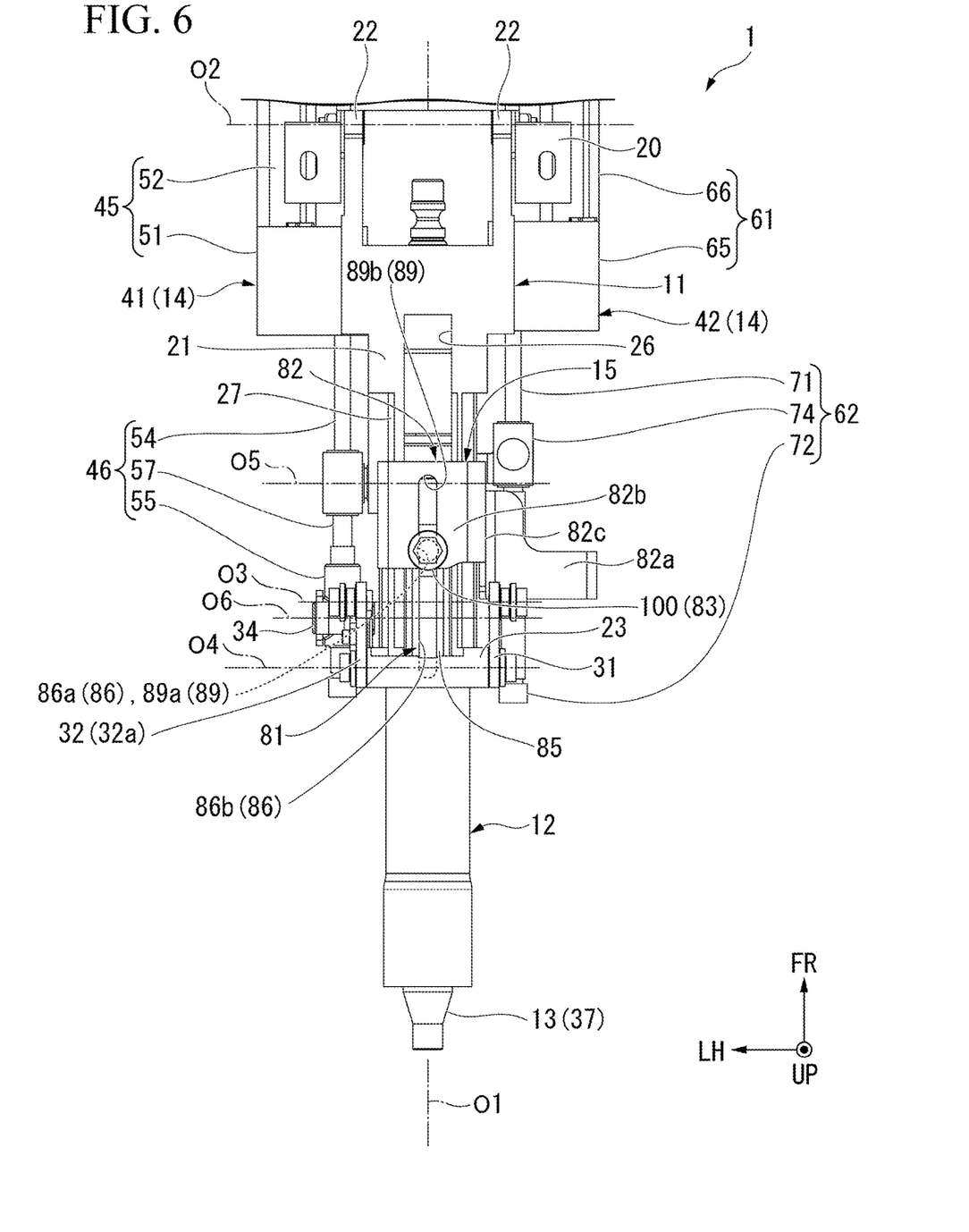
FIG. 6 is a plan view of the steering device in a state where a rear side bracket is detached therefrom.

FIG. 6 is a plan view of the steering device 1 in a state where the rear side bracket 33 is detached therefrom.

As shown in FIG. 6, in the EA plate 81 (top wall portion 85) and the guide plate 82 (sliding wall 88), positions in the shaft axis direction coincide with each other between the large diameter portion 86a of the EA long hole 86 and the large diameter portion 89a of the guide long hole 89. That is, the guide plate 82 overlaps the front end portion of the EA plate 81 in the upward-downward direction (intersection direction). In the present embodiment, the widths of the large diameter portions 86a and 89a (widths in the rightward-leftward direction) are equal to each other.

As shown in FIG. 4, the guide plate 82 further includes a regulation wall portion 83d linked to the left side end portion in the upper wall portion 82b. The regulation wall portion 83d extends downward from the upper wall portion 82b. The regulation wall portion 83d is located leftward of the guide rail 27 located on the left side in the above-described guide rail 27. The regulation wall portion 83d regulates the movement in the rightward-leftward direction of the guide plate 82 with respect to the housing 11 by facing the guide rail 27 in the rightward-leftward direction.

The connection member 83 includes a bolt 100 and a support block 101.

As shown in FIG. 5, a shaft 100a of the bolt 100 penetrates the large diameter portion 86a of the EA long hole 86 and the large diameter portion 89a of the guide long hole 89. In the present embodiment, the shaft 100a is formed in a multistage cylindrical shape. Specifically, the shaft 100a includes an upper shaft 100c and a lower shaft 100d whose outer diameter decreases downward. In the shaft 100a, it is preferable that the outer diameter of the upper shaft 100c is smaller than the width of the large diameter portions 86a and 89a and is larger than the width (width in the rightward-leftward direction) of the small diameter portions 86b and 89b.

As shown in FIG. 4, the support block 101 is housed inside the EA plate 81. The support block 101 is formed in a rectangular parallelepiped shape in which the shaft axis direction is set as a longitudinal direction. The outer surface of the support block 101 is close to or in contact with the inner surface of the EA plate 81. The support block 101 has a female screw hole 101a penetrating the support block 101 in the upward-downward direction. The lower shaft 100d of the above-described bolt 100 is screwed into the female screw hole 101a of the support block 101. In the shaft 100a, a resin washer, a disc spring may be interposed in a portion located between the EA plate 81 and the guide plate 82 or between the head portion 100b of the bolt 100 and the EA plate 81.

Operation

Next, an operation of the above-described steering device 1 will be described. In the following description, a tilt operation, a telescopic operation, and an operation at the time of secondary collision will be mainly described.

Tilt Operation

As shown in FIG. 3, during the tilt operation, a driving force of the tilt motor 52 is transmitted to the housing 11 via the second link plate 32, thereby causing the housing 11 to pivot around the axis line O2. Specifically, in a case where the steering wheel 2 is adjusted to face upward, the tilt motor 52 is driven so as to rotate the tilt wire 54 and the tilt shaft 55 in a first direction, for example. If the tilt shaft 55 is rotated in the first direction, the tilt movable portion 47 moves rearward with respect to the tilt shaft 55. As the tilt movable portion 47 moves rearward, the forward-rearward extending portion 32a of the second link plate 32 and the first link plate 31 pivot upward around the axis line O3. As a result, the steering wheel 2 pivots upward around the axis line O2 together with the housing 11, the pipe 12, and the steering shaft 13.

In a case where the steering wheel 2 is adjusted to face downward, the tilt shaft 55 is rotated in a second direction. Then, the tilt movable portion 47 moves forward with respect to the tilt shaft 55. As the tilt movable portion 47 moves forward, the forward-rearward extending portion 32a of the second link plate 32 and the first link plate 31 pivot downward around the axis line O3. As a result, the steering wheel 2 pivots downward along the axis line O2 together with the housing 11, the pipe 12, and the steering shaft 13.

Telescopic Operation

As shown in FIG. 1, during the telescopic operation, the driving force of the telescopic motor 66 is transmitted to the pipe 12 via the telescopic movable portion 63 and the guide plate 82, thereby causing the pipe 12 and the inner shaft 37 to move forward to and rearward from the housing 11 and the outer shaft 38. Specifically, in a case where the steering wheel 2 is moved rearward, the telescopic wire 71 and the telescopic shaft 72 are rotated in the first direction, for example, by driving the telescopic motor 66. If the telescopic shaft 72 is rotated in the first direction, the telescopic movable portion 63 and the guide plate 82 move rearward from the telescopic shaft 72. In accordance with the rearward movement of the guide plate 82, the pipe 12, the inner shaft 37, the connection member 83, and the EA plate 81 move rearward. In this manner, the steering wheel 2 moves rearward.

In a case where the steering wheel 2 is moved forward, the telescopic wire 71 and the telescopic shaft 72 are rotated in a second direction, for example. If the telescopic shaft 72 is rotated in the second direction, the telescopic movable portion 63 and the guide plate 82 move forward to the telescopic shaft 72. In accordance with the forward movement of the guide plate 82, the pipe 12, the inner shaft 37, the connection member 83, and the EA plate 81 move forward. In this manner, the steering wheel 2 moves forward.

During Secondary Collision

Next, an operation at the time of secondary collision will be described.

As shown in FIG. 6, at the time of secondary collision, the steering wheel 2 together with the pipe 12, the EA plate 81, and the inner shaft 37 moves forward to the housing 11, the outer shaft 38, and the guide plate 82. The guide plate 82 is fixed to the telescopic movable portion 63, and the telescopic movable portion 63 is screwed to the telescopic shaft 72. At the time of secondary collision, the male screw of the telescopic shaft 72 and the female screw of the telescopic movable portion 63 come into contact with each other, thereby regulating the forward movement of the guide plate 82.

Figure 7:
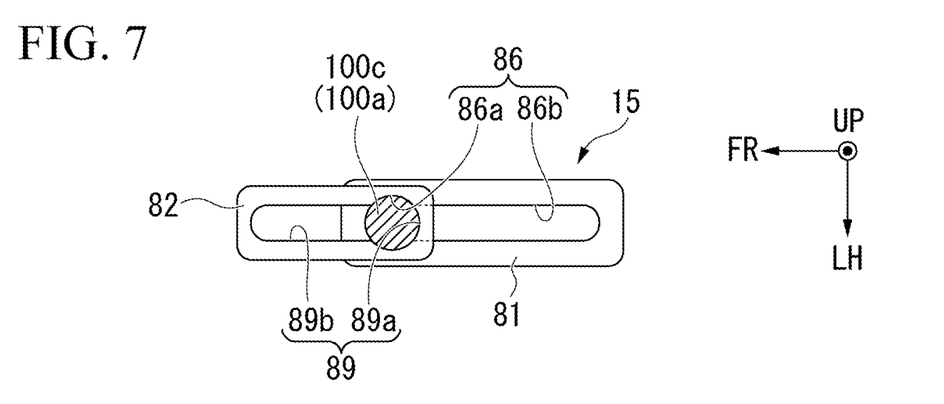
FIG. 7 is a view showing an operation performed at the time of secondary collision.
Figure 8:
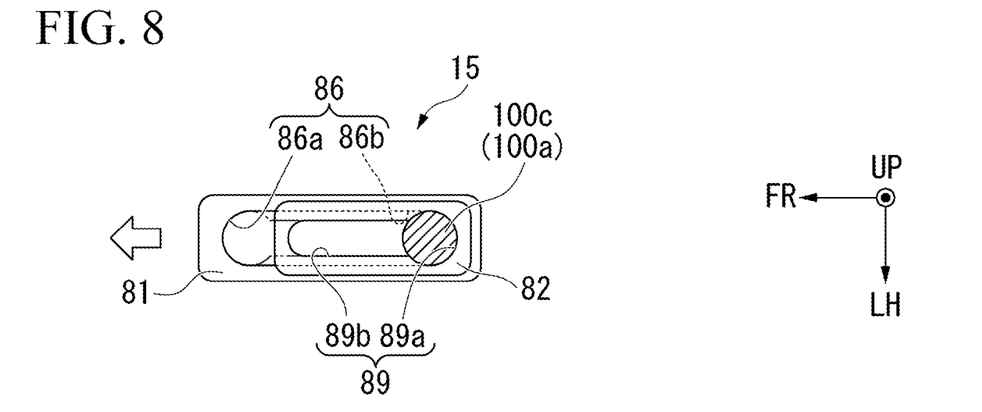
FIG. 8 is a view showing an operation performed at the time of secondary collision.
Figure 9:
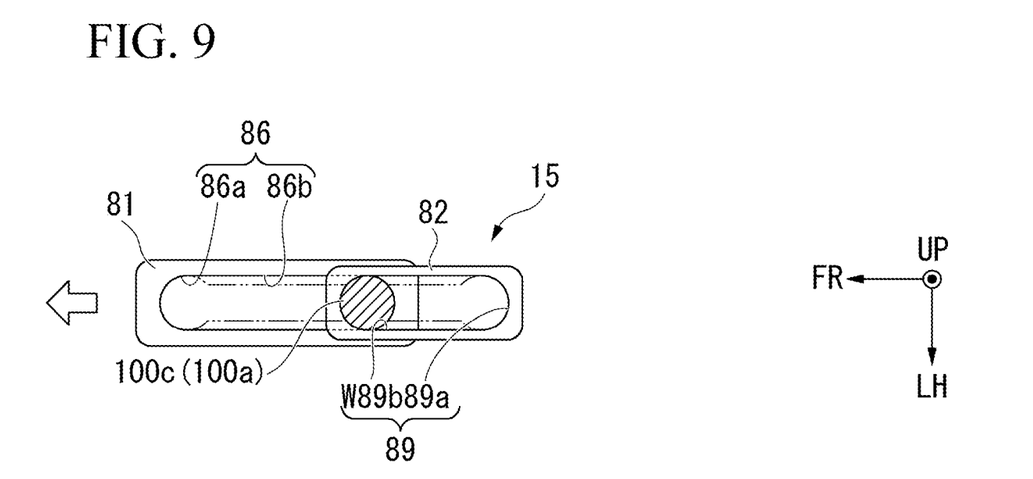
FIG. 9 is a view showing an operation performed at the time of secondary collision.

FIGS. 7 to 9 are views showing the operation at the time of the secondary collision.

FIG. 7 shows the EA plate 81, the guide plate 82, and the bolt 100 serving as the connection member 83 during a normal use. In FIG. 7, at the time of secondary collision, the pipe 12 and the EA plate 81 first move forward to the guide plate 82 and the bolt 100. In this case, the upper shaft 100c of the bolt 100 has a larger diameter than the small diameter portion 86b of the EA long hole 86. Therefore, the EA plate 81 moves forward while the small diameter portion 86b is pressed and widened by the upper shaft 100c (first stage stroke). Then, an impact load applied to a driver at the time of secondary collision is relieved by a load generated when the small diameter portion 86b is pressed and widened (sliding resistance between the upper shaft 100c and the small diameter portion 86b, or a load for plastic deformation of the small diameter portion 86b).

As shown in FIG. 8, if the upper shaft 100c butts against the rear end edge of the small diameter portion 86b, the bolt 100 in addition to the pipe 12 and the EA plate 81 moves forward to the guide plate 82. In this case, the upper shaft 100c of the bolt 100 has the larger diameter than the small diameter portion 89b of the guide long hole 89. Therefore, as shown in FIG. 9, the bolt 100 moves forward while the small diameter portion 89b is pressed and widened by the upper shaft 100c (second stage stroke). Then, an impact load applied to a driver at the time of secondary collision is relieved by a load generated when the small diameter portion 89b is pressed and widened.

At the time of secondary collision, in addition to the load applied when the small diameter portions 86b and 89b are pressed and widened by the bolt 100, the impact load may be relieved by the following methods, for example.

(1) Sliding resistance between the outer peripheral surface of the pipe 12 and the inner peripheral surface of the holding cylinder 21

(2) Sliding resistance between the support block 101 and the EA plate 81

(3) Sliding resistance between the EA plate 81 (top wall portion 85) and the guide plate 82 (upper wall portion 82b)

The sliding portions of the above-described (1) to (3) may be coated with a coating material having a high coefficient of friction may be applied to, or may be processed to have irregularities.

As described above, according to the present embodiment, the EA plate 81 moves forward to the guide plate 82 and the connection member 83 in the first stage stroke, and the connection member 83 and the EA plate 81 move forward to the guide plate 82 in the second stage stroke. That is, in the steering device 1 according to the present embodiment, the load applied between the connection member 83 and the EA plate 81 in the first stage stroke is lower than the load applied between the connection member 83 and the guide plate 82 in the second stage stroke. According to the present embodiment, dimensions of the load absorbing mechanism 15 are set so as to satisfy the above-described conditions.

Table 1 shows a relationship between a plate thickness and an interference in the EA plate 81 (top wall portion 85) and the guide plate 82 (upper wall portion 82b). The "interference" in Table 1 means the interference between the upper shaft 100c and the small diameter portions 86b and 89b.

TABLE 1

|  |  | EA Plate | Guide Plate |
|---|---|---|---|
| Pattern 1 | Plate Thickness | Equal | Equal |
|  | Interference | Smaller | Greater |
| Pattern 2 | Plate Thickness | Smaller | Greater |
|  | Interference | Equal | Equal |
| Pattern 3 | Plate Thickness | Smaller | Greater |
|  | Interference | Smaller | Greater |

As shown in Patterns 1 to 3, according to the present embodiment, at least one of the plate thickness and the interference of the EA plate 81 is set to be smaller than the guide plate 82. In this manner, the EA plate 81 moves forward to the guide plate 82 and the connection member 83 in the first stage stroke, and the connection member 83 and the EA plate 81 move forward to the guide plate 82 in the second stage stroke. In Pattern 1 or Pattern 2, a difference between the loads generated during the first stage stroke and the second stage stroke is likely to be reduced, compared to that in Pattern 3. In this manner, it is possible to minimize load fluctuations when the first stage stroke is switched to the second stage stroke. However, in the EA plate 81 and the guide plate 82, the plate thickness or the interference can be appropriately changed.

In this way, the present embodiment adopts a configuration including the EA plate 81 disposed in the pipe 12, and the connection member 83 which overlaps the guide plate 82 disposed in the telescopic movable portion 63 in the upward-downward direction, which connects the EA plate 81 and the guide plate 82 to each other, and which is slidable relative to the EA plate 81 and the guide plate 82.

According to this configuration, at the time of secondary collision, the collision load can be relieved by the load applied between the connection member 83 and the EA plate 81 and the load applied between the connection member 83 and the guide plate 82. That is, the connection member 83 relatively slides on both the EA plate 81 and the guide plate 82. Therefore, for example, compared to a configuration in which the impact load is relieved only by sliding between the EA plate 81 and the connection member 83, the length of the EA plate 81 in the shaft axis direction can be shortened as much as the length of the guide plate 82 (guide long hole 89). In this manner, the front and rear spaces are likely to be secured for the EA plate 81 while the stroke is secured at the time of secondary collision. Therefore, the layout quality around the pipe 12 can be improved.

In particular, according to the present embodiment, dimensions of the load absorbing mechanism 15 are set so that the load applied between the connection member 83 and the EA plate 81 in the first stage stroke is lower than the load applied between the connection member 83 and the guide plate 82 in the second stage stroke. In this manner, load fluctuations are likely to be managed between the first stage stroke and the second stage stroke, and thus, the impact load can be effectively relieved.

The present embodiment adopts a configuration in which the bolt 100 of the connection member 83 penetrates the EA long hole 86 of the EA plate 81 and the guide long hole 89 of the guide plate 82.

According to this configuration, the EA plate 81 and the guide plate 82 can be reliably connected to each other by the connection member 83. In this manner, when in normal use (for example, during the telescopic operation), the pipe 12 and the telescopic movable portion 63 can be reliably connected to each other via the load absorbing mechanism 15. At the time of secondary collision, the EA plate 81, the guide plate 82, and the connection member 83 can be stably slid.

The present embodiment adopts a configuration in which the small diameter portions 86b and 89b of the long holes 86 and 89 are widened by the connection member 83 at the time of secondary collision.

According to this configuration, at the time of secondary collision, it is possible to secure the load applied between the EA plate 81 and the connection member 83 and the load applied between the guide plate 82 and the connection member 83. In this manner, collision absorbing performance can be improved.

Moreover, compared to a case where the impact load is relieved by the first stage stroke as in the related art, it is possible to prevent the movement of the connection member 83 from being hindered by burrs generated when the slit is widened. Therefore, it is possible to prevent an excessive increase in the load applied between the connection member 83 and the EA plate 81 and the load applied between the connection member 83 and the guide plate 82.

The present embodiment adopts a configuration in which the width of the small diameter portion 86b of the EA long hole 86 is wider than the width of the small diameter portion 89b of the guide long hole 89 (the interference is smaller).

According to this configuration, it is easy to set the load applied between the connection member 83 and the EA plate 81 so as to be smaller than the load applied between the connection member 83 and the guide plate 82. In this manner, the EA plate 81 is likely to move relative to the connection member 83 in the first stage stroke.

The present embodiment adopts a configuration in which the plate thickness of the EA plate 81 is thinner than the plate thickness of the guide plate 82.

According to this configuration, it is easy to set the load applied between the connection member 83 and the EA plate 81 so as to be smaller than the load applied between the connection member 83 and the guide plate 82. In this manner, the EA plate 81 is likely to move relative to the connection member 83 in the first stage stroke.

The present embodiment adopts a configuration in which the telescopic shaft 72 is screwed to the telescopic movable portion 63 in the telescopic mechanism 42.

According to this configuration, at the time of secondary collision, the male screw of the telescopic shaft 72 and the female screw of the telescopic movable portion 63 come into contact with each other. Accordingly, the forward movement of the telescopic movable portion 63 with respect to the housing 11 is regulated. In this manner, it is possible to prevent the guide plate 82 together with the pipe 12 or the EA plate 81 from moving forward during the first stage stroke. In this case, it is not necessary to separately provide a fixing portion of the guide plate 82. Therefore, it is possible to prevent an increase in the number of components and a complicated configuration.

Hitherto, the preferred embodiments according to the present invention have been described. However, the present invention is not limited to the embodiments. Additions, omissions, substitutions, and other modifications of the configurations are possible within the scope not departing from the gist of the present invention. The invention is not limited by the above-described configurations, and is limited only by the appended claims.

For example, in the above-described embodiment, a configuration has been described in which the axis line O1 intersects the forward-rearward direction. However, the invention is not limited to this configuration. The axis line O1 may coincide with the forward-rearward direction of the vehicle.

In the above-described embodiment, a configuration has been described in which the long holes are respectively formed in the EA plate 81 and the guide plate 82. However, the invention is not limited to this configuration. For example, a configuration may be adopted as follows. A thin-wall portion in which the connection member 83 can be broken may be formed in the EA plate 81 and the guide plate 82. Alternatively, the connection member 83 may simply slide on the EA plate 81 and the guide plate 82. The widths of the respective long holes 86 and 89 in the rightward-leftward direction may be uniform over the entire length in the shaft axis direction. That is, in the steering device according to the present invention, a configuration may be adopted as follows. At the time of secondary collision, the sliding resistance may be generated between the EA plate 81 and the connection member 83, and between the guide plate 82 and the connection member 83.

In the above-described embodiment, a configuration has been described in which the EA plate 81 and the guide plate 82 are connected to each other by the bolt 100. However, the invention is not limited to this configuration. For example, the connection member 83 may be slidable on the EA plate 81 and the guide plate 82 by being interposed between the EA plate 81 and the guide plate 82.

In the above-described embodiment, a case has been described where the telescopic mechanism 42 is a feed screw mechanism. However, the invention is not limited to this configuration. For example, the telescopic mechanism 42 may employ a gear.

In the above-described embodiment, a case has been described where the load absorbing mechanism 15 is configured to include two overlapping plates of the EA plate 81 and the guide plate 82. However, the invention is not limited to this configuration. For example, the load absorbing mechanism may be configured to include three or more overlapping plates.

In the above-described embodiment, a configuration has been described in which a motor unit (stationary portion) is disposed in the housing 11. However, the invention is not limited to this configuration. A motor unit (movable portion) may be disposed in the pipe 12.

In the above-described embodiment, a configuration has been described in which the EA plate 81 moves forward to the guide plate 82 and the connection member 83 in the first stage stroke, and in which the connection member 83 and the EA plate 81 move forward to the guide plate 82 in the second stage stroke. However, the invention is not limited to this configuration. A configuration may be adopted as follows. During the first stage stroke, the connection member 83 and the EA plate 81 may move forward to the guide plate 82. During the second stage stroke, the EA plate 81 may move forward to the guide plate 82 and the connection member 83.

In the above-described embodiment, the electrically operated steering device 1 which performs the telescopic operation or the tilt operation by using an actuator (drive mechanism 14) has been described. However, without being limited this configuration, a steering device which can manually perform the telescopic operation or the tilt operation may be used.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering device comprising:
    a pipe into which a steering shaft is inserted so as to be rotatable around a first axis line extending along a forward-rearward direction;
    a housing that is supported by a vehicle body, and that supports the pipe so as to be movable in the forward-rearward direction;
    a telescopic mechanism that moves the pipe with respect to the housing in the forward-rearward direction; and
    a load absorbing mechanism that is disposed between the pipe and the telescopic mechanism,
    wherein the load absorbing mechanism includes
        an EA plate disposed in the pipe,
        a guide plate disposed in the telescopic mechanism, and overlapped with the EA plate when viewed in an intersection direction intersecting the forward-rearward direction, and
        a connection member which connects the EA plate and the guide plate to each other, and which is relatively slidable on the EA plate and the guide plate in a case where a forward acting load applied to the pipe has a predetermined value or greater, and
    wherein in a case where the forward acting load applied to the pipe has the predetermined value or greater, the load absorbing mechanism sets sliding resistance between the connection member and a first plate out of the EA plate and the guide plate and sliding resistance between the connection member and a second plate out of the EA plate and the guide plate so that the connection member relatively moves forward to the second plate after the first plate relatively moves forward to the connection member.

2. The steering device according to claim 1,
    wherein the EA plate has an EA long hole penetrating the EA plate in the intersection direction, and extending in the forward-rearward direction,
    wherein the guide plate has a guide long hole penetrating the guide plate in the intersection direction, and extending in the forward-rearward direction, and
    wherein the connection member connects the EA plate and the guide plate to each other by penetrating a front end portion of the EA long hole and a rear end portion of the guide long hole.

3. The steering device according to claim 2,
    wherein the EA long hole has
        a first large diameter portion which is located in the front end portion of the EA long hole, and into which the connection member is inserted, and
        a first small diameter portion which is linked to the first large diameter portion, and which is widened by the connection member during relative movement between the connection member and the EA plate in the forward-rearward direction,
    wherein the guide long hole has
        a second large diameter portion which is located in the rear end portion of the guide long hole, and into which the connection member is inserted, and
        a second small diameter portion which is linked to the second large diameter portion, and which is widened by the connection member during relative movement between the connection member and the guide plate in the forward-rearward direction, and
    wherein a width of the first small diameter portion is wider than a width of the second small diameter portion.

4. The steering device according to claim 2,
    wherein the EA plate has a thinner plate thickness than the guide plate.

5. The steering device according to claim 1,
    wherein the telescopic mechanism includes
        a motor unit disposed in the housing,
        a shaft having a male screw joined to an output shaft of the motor unit, and
        a nut screwed to the shaft.

* * * * *